United States Patent [19]
Booth

[11] Patent Number: 5,247,696
[45] Date of Patent: Sep. 21, 1993

[54] METHOD FOR COMPILING LOOPS HAVING RECURSIVE EQUATIONS BY DETECTING AND CORRECTING RECURRING DATA POINTS BEFORE STORING THE RESULT TO MEMORY

[75] Inventor: Michael W. Booth, Apple Valley, Minn.

[73] Assignee: Cray Research, Inc., Eagan, Minn.

[21] Appl. No.: 642,480

[22] Filed: Jan. 17, 1991

[51] Int. Cl.$^5$ ............................................. G06F 9/45
[52] U.S. Cl. .................................. 395/800; 395/700; 395/375; 364/730; 364/931.51; 364/DIG. 2; 364/232.21
[58] Field of Search ................ 395/800, 700, 375; 364/730

[56] References Cited

U.S. PATENT DOCUMENTS

| | | | |
|---|---|---|---|
| 4,710,872 | 12/1987 | Scarborough | 395/700 |
| 4,821,181 | 4/1989 | Iwasawa et al. | 395/500 |
| 4,833,606 | 5/1989 | Iwasawa et al. | 395/700 |
| 4,858,115 | 8/1989 | Rusterholz et al. | 395/800 |
| 4,967,350 | 10/1990 | Maeda et al. | 395/800 |
| 5,036,454 | 7/1991 | Rau et al. | 395/375 |
| 5,083,267 | 1/1992 | Rau et al. | 395/375 |
| 5,151,991 | 9/1992 | Iwasawa et al. | 395/700 |

FOREIGN PATENT DOCUMENTS 63-120338  5/1988  Japan.

Primary Examiner—Thomas C. Lee
Assistant Examiner—Paul Harrity
Attorney, Agent, or Firm—Merchant, Gould, Smith, Edell, Welter & Schmidt 2 Claims, 5 Drawing Sheets

```
         subroutine update(X,Y,j,n)

real X(*),Y(*) ,tmp(0:63)
         integer j(*)
  5      pointer (aptr,index(*))

*
         * do i=1,n
         *  X(j(i)) = X(j(i)) + Y(i)
 10      * end do
         *
         aptr =loc(a)

do i1=1,n,64
 15
           i2=0
             do i3=i1,min(i1+63,n)
               tmp(i2)=X(j(i3))+Y(i3)
               i2=i2+1
 20          end do i2=0
             do i3=i1,min(i1+63,n)
               index(j(i3))=i2
 25            i2=i2+1
             end do i2=0
             do i3=i1,min(i1+63,n)
 30            if(index(j(i3)).ne.i2) then
                 tmp(index(j(i3)))=tmp(index(j(i3)))+Y(i3)
               end if
               i2=i2+1
             end do
 35
           i2=0
             do i3=i1,min(i1+63,n)
               X(j(i3))=tmp(i2)
               i2=i2+1
 40          end do end do
         end
```

* DENOTES SCALAR OPERATIONS

METHOD FOR COMPILING LOOPS HAVING RECURSIVE EQUATIONS BY DETECTING AND CORRECTING RECURRING DATA POINTS BEFORE STORING THE RESULT TO MEMORY

BACKGROUND OF THE INVENTION

1. Field of the Invention

The present invention pertains generally to the field of high speed digital processing systems, and more particularly to a method of vectorizing loops containing recursive equations in a supercomputer.

2. Background of the Invention

Supercomputers are high performance computing platforms that employ a pipelined vector processing approach to solving numerical problems. Vectors are ordered sets of data. Problems that can be structured as a sequence of operations on vectors can experience one to two orders of magnitude increased throughput when executed on a vector machine (compared to execution on a scalar machine of the same cost). Pipelining further increases throughput by hiding memory latency through the prefetching of instructions and data.

A pipelined vector machine is disclosed in U.S. Pat. No. 4,128,880, issued Dec. 5, 1978, to Cray, the disclosure of which is hereby incorporated herein by reference. In the Cray machine, vectors are processed by loading them into operand vector registers, streaming them through a data processing pipeline having a functional unit, and receiving the output in a result vector register. A vector machine according to U.S. Pat. No. 4,128,880 supports fully parallel operation by allowing multiple pipelines to execute concurrently on independent streams of data.

For vectorizable problems, vector processing is faster and more efficient than scalar processing. Overhead associated with maintenance of the loop-control variable (for example, incrementing and checking the count) is reduced. In addition, central memory conflicts are reduced (fewer but bigger requests) and data processing units are used more efficiently (through data streaming).

Vector processing supercomputers are used for a variety of large-scale numerical problems. Applications typically are highly structured computations that model physical processes. They exhibit a heavy dependence on floating-point arithmetic due to the potentially large dynamic range of values within these computations. Problems requiring modeling of heat or fluid flow, or of the behavior of a plasma, are examples of such applications.

Program code for execution on vector processing supercomputers must be vectorized to exploit the performance advantages of vector processing. Vectorization typically breaks up a loop of the form:

```
do i = 1 to n
    X(i) = f{X(i), Y(i)}
enddo
``` into a nested loop of the form:

```
do k = 0 to n - 1 by VL
    do l = 1 to VL
        X(k + 1) = f{X(k + 1), Y(k + 1)}
    enddo
enddo
``` where VL is the length of the vector registers of the system. This process is known as "strip mining the loop". In strip mining, the number of iterations in the internal loop is defined by the length of a vector register. The number of iterations of the external loop is defined as an integer number of vector lengths. The remaining iterations are performed as a separate loop placed before the nested loop. Vector length arrays of data from the original data arrays are loaded into the vector registers for each iteration of the internal loop. Data from these vector registers can then be processed at the one element per clock period rate of a vector operation.

Compilers exist that will automatically apply strip mining techniques to scalar loops within program code to create vectorized loops. This capability greatly simplifies programming efficient vector processing. The programmer simply enters code of the form:

```
do i = 1 to n
    X(i) = f{X(i), Y(i)}
enddo
``` and it is vectorized.

There are, however, certain types of problems that resist vectorization. Equations of the form:

```
do i = 1 to n
    X(j(i)) = f{X(j(i)), Y(i)}
enddo
``` are difficult to vectorize due to the possibility that the same data point in X may be needed for different $Y(i)$ within a single vector operation.

Present compilers are designed to recognize the possibility of recurring points in a loop and inhibit vectorization so that the equation is solved by a scalar loop. The reasons for this are varied. The range and contents of $j(i)$ may not be known until run time, making it difficult to predict recurring data points. Also, it is difficult to allocate memory for expressions like $X(j(i))$ in which array X may be of an arbitrary length to be determined at run time. For example, it is a common practice within advanced programming languages to pass an array X(1) implying X is infinite in length. A practical compiler may never know the size of the array and, as long as the data does not overlap, the program will execute properly.

There are programming steps that can be taken to regain some of the performance lost in executing recursive equations in scalar loops. Some compilers offer a compiler directive that can be used to force vectorization of loops that would not vectorize otherwise due to the appearance of recurring data points. Programmers using such a directive take on the responsibility of making sure that there are, in fact, no recurring data points within a vector operation inside the loop.

In addition, there exist a number of algorithms that can be used to structure program code to prevent recurring data or detect if operations have been affected by the vectorization process. One such algorithm creates a temporary area in memory and uses it to separate operations on the same data point. This method is called the work vector method. Since the source of error in vectorizing recursive loops lies in the occurrence of a data point more than once within a vector in the internal loop, a work vector is created to serve as intermediate storage of the result of the calculation. If array X is of size M and the vector length of the machine is VL, work vector WV[k,l] will be a two-dimensional array of size M * VL. The result of each pass through the internal loop is accumulated in the work vector array at the location 1 defined by its place in the vector and the address k of the original data point. That result is used in future calculations on the same data point in the same location in the operand vector. Two operations on the same data point in a vector operation result in writes to two different locations in the work vector. The last step in performing the original loop is to add elements 1 through VL for each data point in X.

The work vector method is simple. It can lead to impressive gains in performance over the scalar approach. But as the size of array X becomes large, the memory requirements for the work vector array become burdensome. Also, in cases of little overlap or of limited operations within M (smaller n/M), addition of elements 1 through VL for each data point in X leads to a large number of zero additions.

An alternate approach was suggested in a paper entitled "Present Status of Computer Simulation at IPP", by Dr. Yoshihiko Abe, in Supercomputing 88: volume II, Science and Applications in 1989. Abe proposed a method of vectorizing recursive equations which consisted of breaking one large loop into a number of smaller loops, performing vector operations on the smaller loops, flagging recurring data points within the vector operation and correcting the result. The Abe method creates two new vectors L and K of size M and 2*VL, respectively. Vector L is a scratch pad vector used to record the identity of the last Y(i) added to a data point. Vector K is a scratch pad vector used to record the location of elements of Y(i) whose contribution to X was missed due to the vector operation.

The Abe method assumes that the amount of overlap is fairly small. Therefore the cost of tracking overlap and performing calculations on those elements which were missed due to overlap is low. The frequency of correction must be kept small in order to get good performance from this algorithm. But in a large class of problems (e.g. Monte Carlo simulations) the number of iterations is small in comparison to data point space. For these types of problems, the Abe method will give a substantial boost in performance.

There are drawbacks to the Abe technique, however. Memory must be set aside that is equivalent to the size of the array of data points. This memory (vector L above) is needed to record the identity of the last element used to operate on that data point. In addition, memory must be set aside (vector K) as a stack for recording the location of elements missed due to overlap. This additional memory can get large for large M. The total memory needed required by the Abe method is, however, smaller than that required by the work vector method.

Most importantly, the Abe method is difficult to implement in a practical compiler. The size M of array X is rarely known at compile time. Although it is possible for a compiler to allocate vector K based on the value of M calculated at run time, the time required to scan j in order to determine the maximum size required for K would severely curtail any performance benefits gained from the execution of Abe's method.

A different approach was presented by Giuseppe Paruolo in an article entitled "A Vector-Efficient and Memory-Saving Interpolation Algorithm for PIC Codes on a Cray X-MP" published in the Journal of Computational Physics 89 in 1990. Paruolo suggests a method in which two temporary work arrays are used to detect and compensate for recurring data points. Two working arrays are created, IAG and IAP. IAG is the same size as X. IAP is the same size as Y. IAG serves as a pool of pointers linking elements in Y to their corresponding data points in X. The method consists of writing the location of each element in Y to the location in IAG corresponding to the data point affected in X. Locations in IAG that are affected by more than one element of Y are written into more than once. After one pass through IAP, IAG contains pointers to no more than one element in Y for each data point in X. A new X is calculated using the values of Y pointed to by IAG and those elements of Y are removed from the pool.

The above process is repeated until all elements of Y are consumed, the pool of elements in Y falls beneath a threshold or the number of elements consumed in a pass falls beneath a threshold. The remaining iterations are then solved with a scalar loop.

Paruolo's method, like Abe, requires additional memory. Memory must be set aside that is equivalent to the sum of the size of array Y and the size of array X. This additional memory can get large for large n or large M. Like Abe, Paruolo's method is difficult to implement in a practical compiler due to the difficulty in determining the size of X prior to algorithm execution time.

Abe and Paruolo are geared to solving different types of problems. Abe works best in a large data space with little overlapping of elements. Paruolo works best in a data space with a great deal of overlap, as in the case where the number of elements in Y is much greater than the number of data points in X. The Paruolo method is optimized toward problems exhibiting a uniform distribution of elements of Y over the data points of X. However, it would perform no worse than the scalar calculation in the case of total overlap (i.e. all elements in Y affect one point in X).

Each of the three algorithms discussed offer ways of structuring loops containing recursive equations so as to take advantage of some level of vectorization. They share a requirement for large amounts of additional memory that limits the size of problems that can be executed and may force otherwise vectorizable calculations to be performed in scalar mode.

In addition, use of these algorithms requires a conscious effort on the part of programmers to structure their programs. The programmer must convert a problem that involves recurring data points into a different approach that can take advantage of these methods. It is difficult to construct a practical compiler that will automatically vectorize loops containing ambiguous references to possibly recurring data points using these methods. The ambiguous nature of references to data point arrays such as X means that compilers implementing these algorithms would be required to allocate memory at run time based on the contents of one or more data arrays. This approach would be complex and the time required to determine the required memory size would probably outweigh any performance increase gained from compiled execution.

It is clear that there is a need for improved methods of vectorizing scalar loops. A system which can operate to vectorize scalar loops containing recursive equations with no additional memory requirements is desired. In addition, there is a need for a method of vectorizing scalar loops containing recursive equations that can be placed into a compiler and automatically vectorize such loops.

SUMMARY OF THE INVENTION

The present invention provides a vector update method for vectorizing loops containing recursive equations within a supercomputer. Program code containing a loop is transformed into a nested loop in which the interior loop performs an integer number of iterations of the original loop equal to the vector length of the system. Vector operations are executed on the arrays of data within the interior loop, a check is made for recurring data points and repairs are made to the results of the vector operations. All repairs are completed before exiting the interior loop.

The vector update method requires no additional memory for the vectorization of program code. Furthermore, it is designed to vectorize loops without recursive elements with negligible loss in performance. A system implemented according to the present invention demonstrates a noticeable increase in the speed of program execution and can handle larger problems than systems implemented under previous methods.

According to another aspect of this invention, a compiler constructed to include the vector update method of vectorizing code will automatically transform program code containing loops into vectorized code. A compiler according to this invention generates code without allocating additional work space memory. This means that it can operate independent of the data used in the program to be compiled, eliminating the run time determination of memory sizes required by compilers implemented with other methods.

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1:
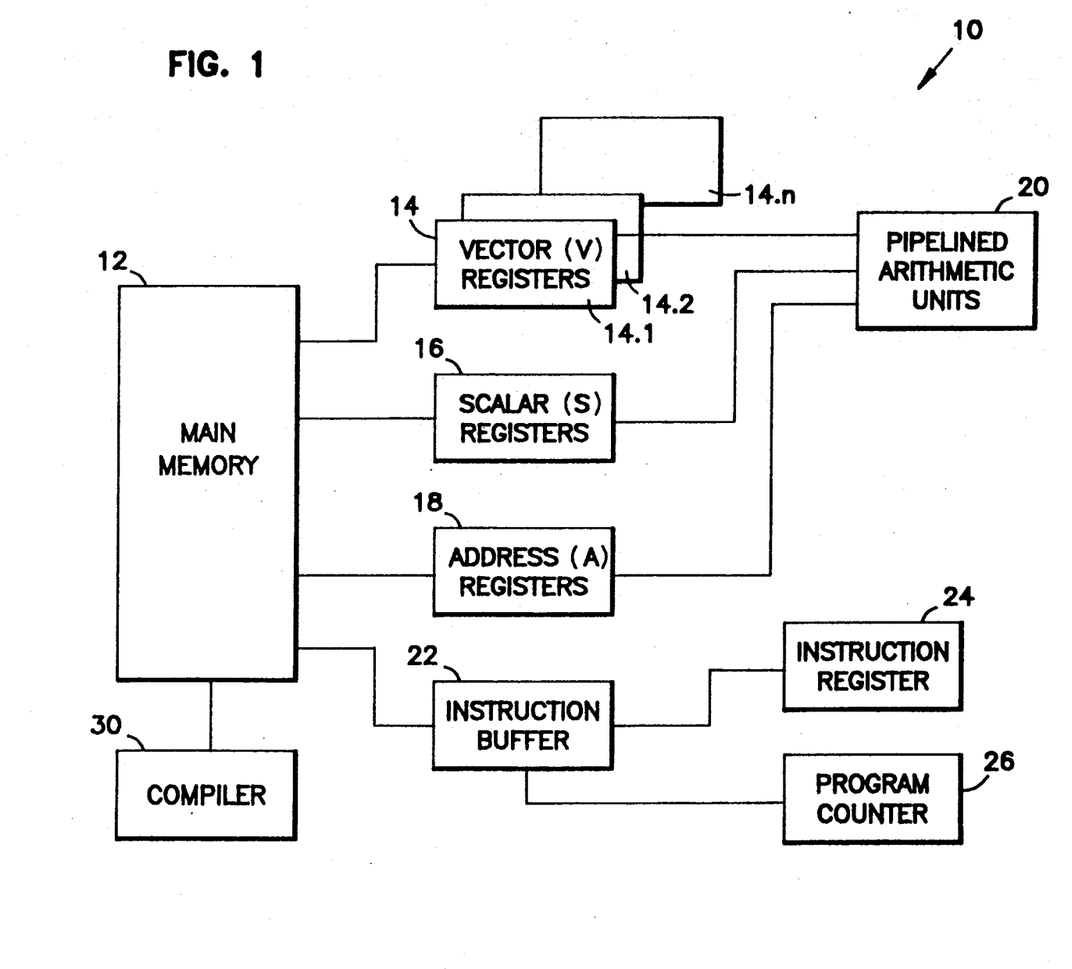
FIG. 1 is a block diagram representative of a typical vector processing computer system according to the present invention.

A computer system 10 which can be used for high speed data processing is illustrated generally in FIG. 1. Computer system 10 is a typical pipelined vector processing system which includes a main memory 12, a plurality of vector registers 14, a plurality of scalar registers 16, a plurality of address registers 18, a plurality of arithmetic units 20, an instruction buffer 22, an instruction register 24, a program counter 26 and a compiler 30. Computer system 10 also includes control hardware for operating in either scalar or vector mode (not shown). Vector registers 14, scalar registers 16 and address registers 18 are connected to main memory 12 and serve as intermediate high-speed memory between main memory 12 and arithmetic units 20. Vector registers 14.1 through 14.n are of uniform vector register length VL and are connected to main memory 12 and arithmetic units 20. Compiler 30 is connected to main memory 12 and serves to convert program code into machine executable code in preparation for execution in computer 10. Instruction buffer 22 is connected to main memory 12 and serves as intermediate high-speed memory between main memory 12 and instruction register 24.

To operate computer system 10, data is loaded from memory 12 into one or more of vector registers 14. Those vector registers 14 used as operand registers for a given vector process transmit individual elements to an arithmetic unit 20 at the rate of one element per time period. Once the start-up time, or arithmetic unit time, has passed, the arithmetic unit provides successive result elements on successive time periods, and these are transmitted as elements of a result vector to a vector register 14 acting as a result register for that particular vector process. Vector transfers between vector registers 14 and main memory 12 may also be accomplished at one element per time period.

By providing a number of arithmetic units (for example, floating point multiply, integer add, logical operations, etc.) and a number of vector registers 14 (for example, eight), any of which may be associated by program instruction control with any arithmetic unit 20 or memory 12, computer system 10 may have numerous vector processes proceeding simultaneously, thereby achieving extremely high data processing rates.

Program code to be run on computer system 10 must be vectorized to exploit the performance advantages inherent in vector processing. Program code containing loops in which mathematical or logical operations are performed on arrays of data points can be vectorized using the vector update method of the present invention. In the preferred embodiment of this invention this code vectorization is performed by a compiler. In an alternate embodiment, the method of this invention can be used by programmers to restructure program code for use on vector processing systems that do not have this compiler.

Figure 2:
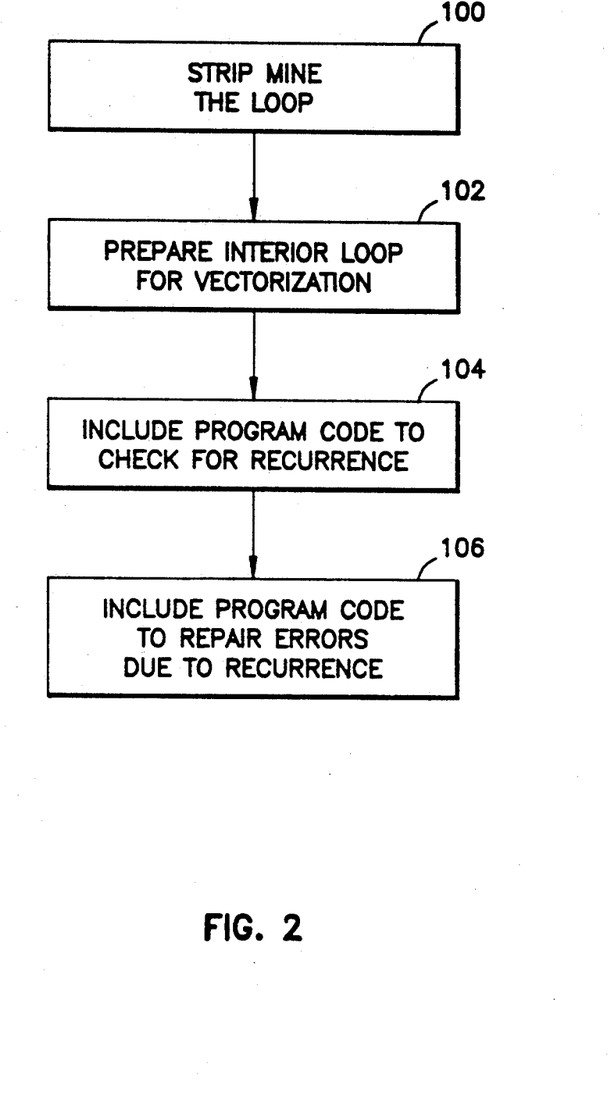
FIG. 2 is a flow diagram representative of the steps taken to vectorize program code containing a loop according to the present invention.

A flow chart of the steps of the present invention is shown in FIG. 2. At 100, program code containing a loop is converted into program code containing a nested loop of depth two through the process of strip mining. The resulting interior loop is of length VL, the vector length of the system. At 102, functions to be performed within the interior loop are set up as vector operations with the results to be saved to an intermediate vector register.

The steps of strip mining and vectorizing ignore the possibility of recurring data points. At 104, recurring data points are detected by including program code that writes the numbers 0 through VL−1 to the locations in memory of the data points used in the current interior loop. Recurring data points will be written to more than once, with the last number written pointing to the location in the intermediate vector register of the last valid operation performed on that data point.

At 106, program code is included that repairs those elements in the intermediate vector register associated with the recurring data points and saves the results to memory.

A system implemented according to the present invention has several advantages over a system implemented using the work method, Abe's method or Paruolo's method. There are no additional memory requirements. Systems implemented using this method, in effect, oversubscribe memory. Data point arrays become scratch pads for marking errors in vectorization due to recurring data points. This leads to greater efficiency in the use of memory, resulting in the capacity to handle larger problems in the same memory space. It also eases demand on memory bandwidth.

The vector update method tracks and repairs errors due to recurring data points within the internal loop of the vectorized code. Unlike Abe or Paruolo, this method operates on a set of elements from operand arrays acting on the data point arrays until all elements in the set are consumed. Abe must maintain in memory a list of elements that were missed by forced vectorization. He must then enter a second series of operations to repair the damage. Paruolo must maintain in memory two arrays, one for matching elements from a pool of elements to locations representative of the data point array X and the other to track the remaining elements in the pool.

A robust general compiler capable of vectorizing recursive equations can be developed using the vector update method. The vector update method consumes elements of the operand arrays as they are handled. Computer 10 remains inside the vector update loop until all recurring data points are corrected. More importantly, since the vector update method requires no additional memory for tracking recurring data points, there is no requirement for determining the size of data point arrays. A compiler implemented under the Abe or Paruolo methods is required to perform a run time determination of the maximum size of the index into the data point array. This is no longer required. Program code can be compiled at compile time with no additional run time memory allocation steps.

Figure 4:
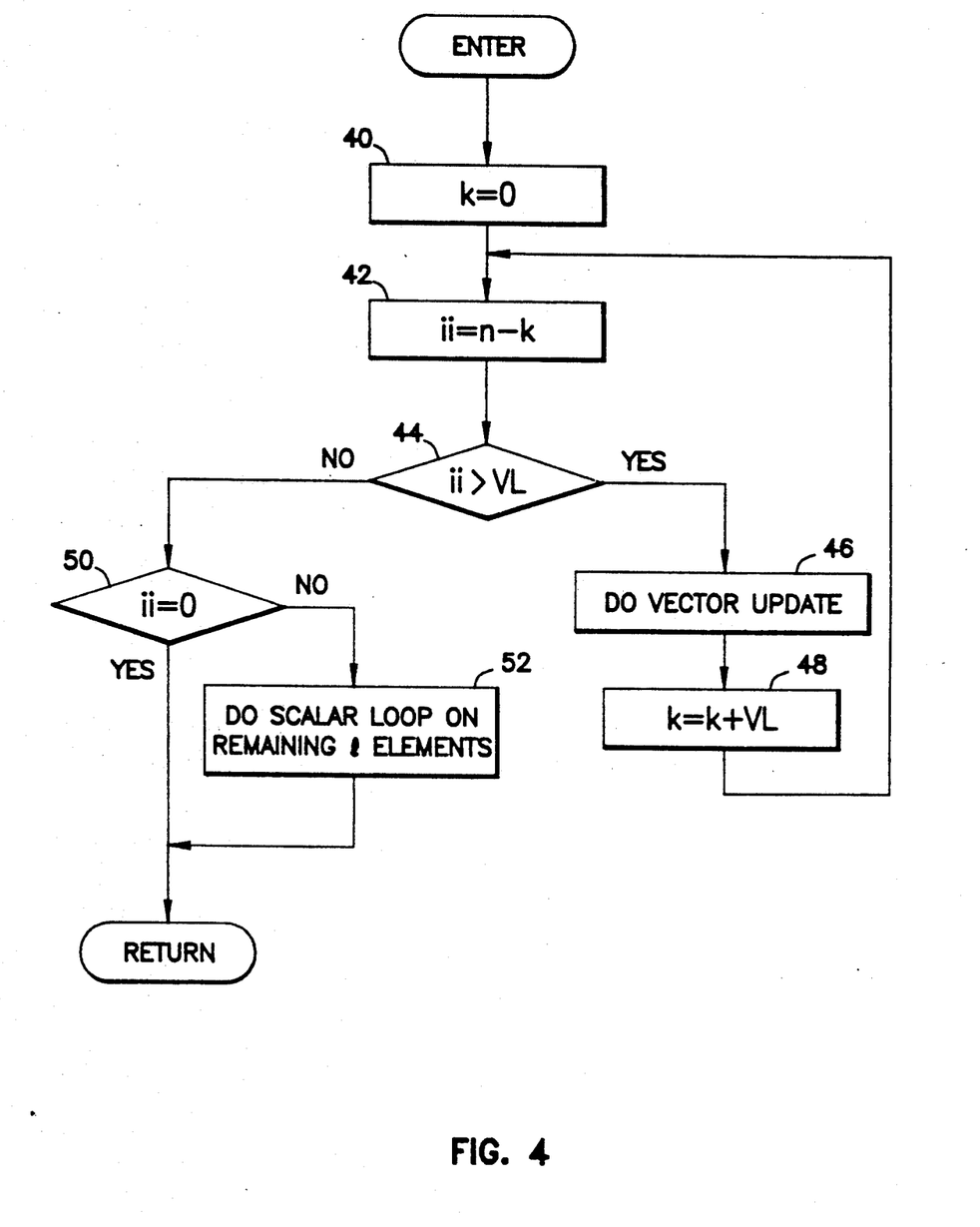
FIGS. 4 and 5 are flow diagrams representative of the steps a vector processing computer system goes through in executing a vectorized loop after compiling with the vector update method of the present invention.
Figure 5:
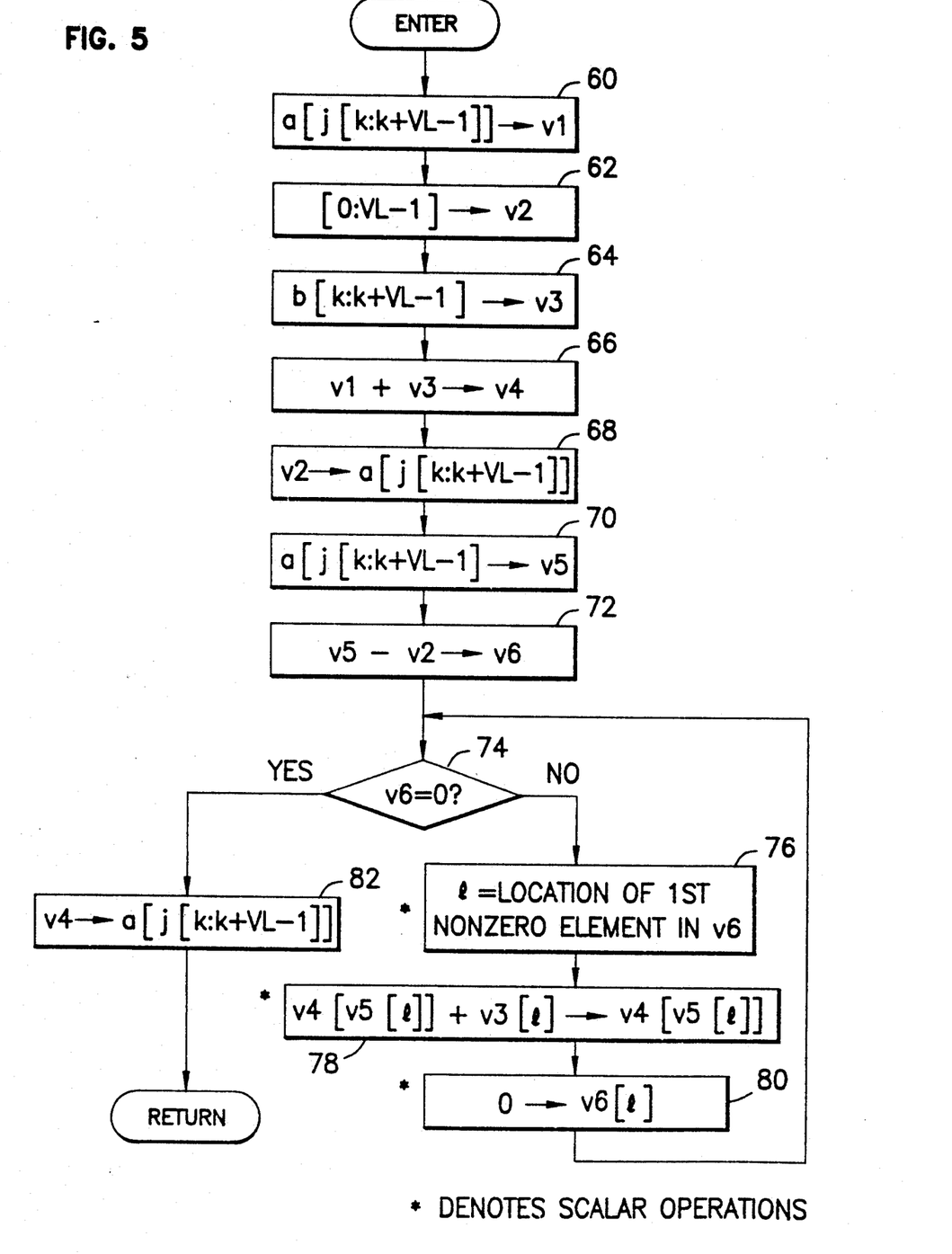

FIGS. 4 and 5 illustrate an embodiment of the steps computer system 10 will execute after compiler 30 has compiled program code of the form:

$$do\ i = 1\ to\ n$$
$$X(j(i)) = X(j(i)) + Y(i)$$
$$enddo$$

into vectorized code. It should be apparent to those skilled in the art that other equations including equations of the form $X(j(i))=f\{X(j(i)), Y(), \ldots, Z()\}$ could be compiled using the same technique.

FIG. 4 illustrates the result of strip mining the loop. The routine in FIG. 4 is entered at 40 where the index variable k is initialized to zero. At 42 an initial value of ii is calculated. At 44 a check is made to see if ii is greater than or equal to VL (the vector register length of the computer used). If ii is greater than VL−1, computer 10 moves to 46 and performs the vector update method's vector operation and correction for recurring data points. Upon completion, at 48, a value equivalent to the length of a vector register is added to k. Steps 42, 44, 46 and 48 are repeated until the number of elements in ii is less than VL.

When the number of elements remaining to be processed is less than the vector length of a vector register, the remaining calculations are performed in a scalar loop. At 50, a check is made to see if all elements have been consumed. If so, control returns to the main program. If not, the remaining calculations are performed as a scalar loop of ii iterations. Then control returns to the main program.

Vectorized compiling with the vector update method results in code that executes a set of equations of the form:

$$I1 = MOD(n, VL)$$
$$do\ k = 1\ to\ n - I1\ by\ VL$$
$$\quad do\ ii = 0\ to\ VL - 1$$
$$\quad\quad X(j(k + ii)) = f\{X(j(k + ii)), Y(k + ii)\}$$
$$\quad enddo$$
$$enddo$$
$$do\ k = n - I1 + 1\ to\ n$$
$$\quad X(j(k)) = f\{X(j(k)), Y(k)\}$$
$$enddo$$

where the internal loop calculation of the nested loop is performed as a vector operation.

FIG. 5 illustrates the preferred embodiment of the steps a vector processing computer goes through in executing a loop vectorized by a compiler 30 using the present invention. This routine will work with all loops including those containing recurring data points. The routine is entered at 60 where the contents of array X selected by j(i) in the current iteration of the loop are transferred from memory 12 to vector register 14.1. At 62, vector register 14.2 is loaded with the values of 0 through VL−1 (where VL is the vector length of computer 10). Vector register 14.2 will serve as a constant vector in the determination of recurring data points within the vector loop. At 64, vector register 14.3 is loaded with the values of Y selected by i in the current iteration.

At 66, the vector operation(s) are performed as if there are no recurring data points. In this example, the operation is the addition of X(j(i)) and Y(i). The results are stored in vector register 14.4.

Steps 68 through 72 search for recurring data points. At 68, the elements of vector register 14.2 are written to the locations in X involved in the current loop. Any recurring points will be written to more than once, with the last element written corresponding to the last vector operation performed on that data point. At 70, the contents of array X selected by j(i) in the current iteration are transferred from memory 12 to vector register 14.5. If there are no recurring points, vector register 14.5 will be a replica of vector register 14.2. If there are recurring data points, the location of the last vector operation performed on that data point will occur more than once in vector register 14.5.

At 72, a test is made for recurring data points. Vector register 14.2 is subtracted from vector register 14.5 and the result stored in a vector register 14.6. At 74, a check is made for any non-zero entries in vector register 14.6.

If not, there were no recurring data points and at 82 the updated values of X from vector register 14.4 are saved to memory 12. Control is returned to the strip mining loop of FIG. 5.

If, at 74, the check turns up one or more non-zero entries a scalar loop is entered. At 76 the location of the first non-zero element in vector register 14.6 is saved to variable 1. Variable 1 points at the element in vector register 14.3 whose operation on X was overwritten in step 66. At 78, this operation is performed. At 80, element 1 in vector register 14.6 is set to zero and control returns to 74. Steps 74, 76, 78, and 80 are repeated until all non-zero elements in vector register 14.6 have been set to zero.

Then control moves to 82, the updated values of X from vector register 14.4 are saved to memory 12 and control is returned to the exterior loop of FIG. 5.

In vector processing computer systems implemented with vector mask registers, an alternate embodiment of step 74 would be to use the vector mask register to mark the location of non-zero entries in vector register 14.6. Repair would then consist of a scalar loop that goes bit by bit through the vector mask register and performs the required operations on those locations corresponding to bits set to one in the vector mask register.

In an alternate embodiment, programmers can improve execution of code containing recursive equations by structuring their code according to the present invention. This would only be necessary in the case of program code that is intended to be executed on a vector processing computer that does not contain a compiler including the vector update method for vectorized compiling.

Figure 3:
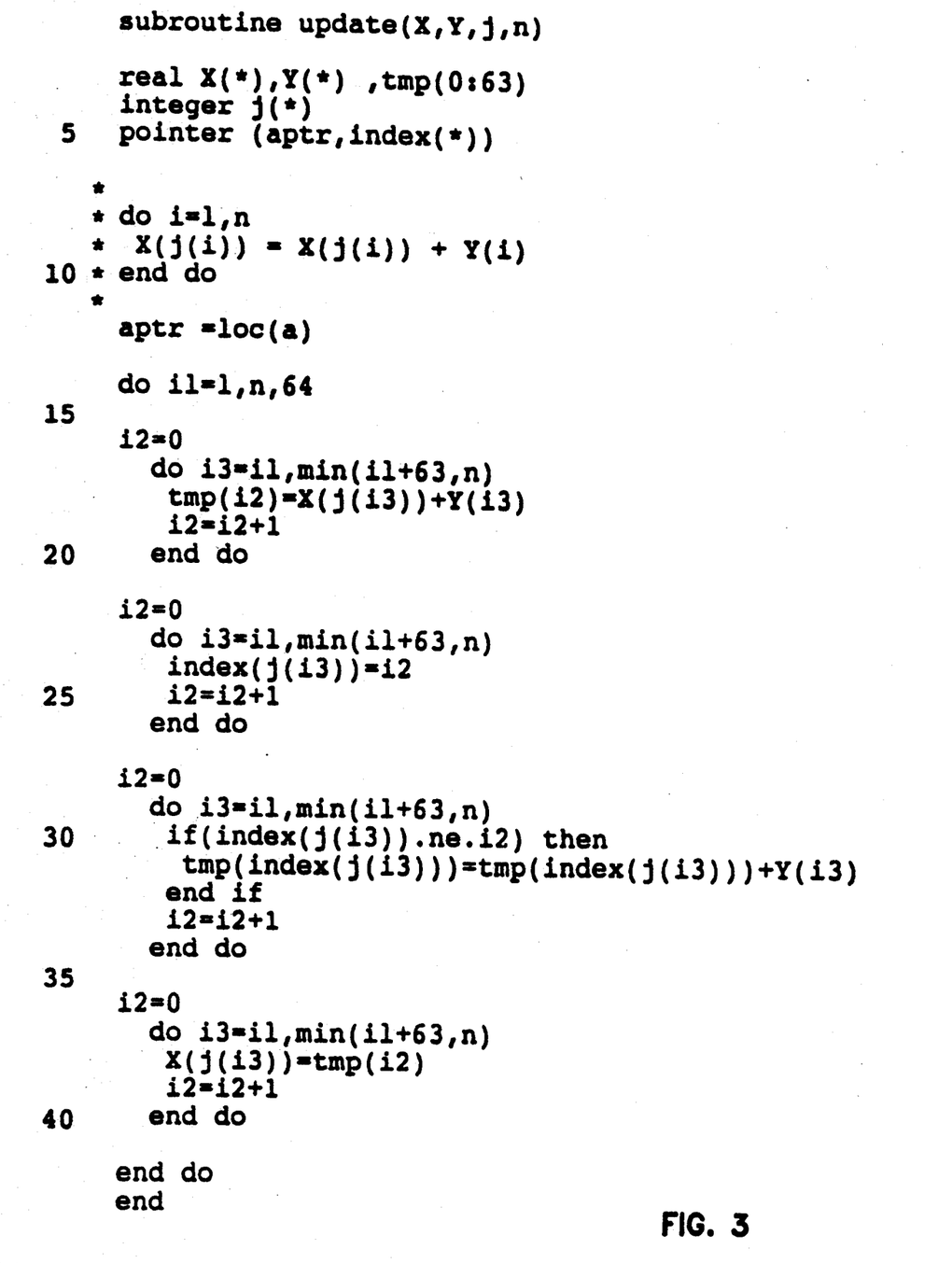
FIG. 3 is a FORTRAN representation of a program solving an algorithm containing recurring data points using the vector update method of the present invention.

A FORTRAN subroutine for implementing the vector update method on a vector processing computer is shown in FIG. 3. It has been written to be executed on a vector processing computer containing vector registers of length 64 (e.g. a Cray supercomputer). The subroutine shown executes an operation of the form $X(j(i))=X(j(i))+Y(i)$. The array j(i) is a pointer array used to match the elements of Y to the data points of X. It should be apparent to those skilled in the art that other equations including equations of the form $X(j(i))=f\{X(j(i)), Y(), \ldots, Z()\}$ could be implemented using the same technique.

In the subroutine of FIG. 3, lines 3-5 are variable declarations. The array tmp is the only additional memory required by routines implemented according to the present invention. The size of tmp has been chosen such that the compiler will assign tmp to a vector register rather than external memory. Lines 7-11 are comments depicting the recursive loop that is being solved according to the present invention. Line 12 is the definition of a pointer to the array of data points X.

Lines 14 and 42 are the exterior loop created by the strip mining process. Lines 16 through 20 perform the forced vectorization, saving the results into tmp. Lines 22 through 26 write an index value into the array X at the locations read during the forced vectorization performed by lines 16 through 20. In the event of a recurring data point, data point array X will contain the final index value written to that location.

Lines 28 through 34 check to see if all index values can be read back and compensate for recurring data points. At line 29 a check is made to see if there was a recurring data point. In the event of a recurring data point the index value read back at that location will differ from the index value expected. The index value read will, however, point to the location in tmp containing the result of the last valid operation on that data point. This permits the execution at line 31 of an instruction to perform the needed additional operation on that data point. Lines 36 through 40 write the results of the internal loop back to memory.

As an enhancement to programs structured according to the present invention, programmers should use their knowledge as to the nature of the data in their model to adjust the stride through the elements to decrease the likelihood of recurring data points. This would be appropriate in data structures that have recurring data points as a function of location in the array.

The replacement of a scalar loop representing a recursive equation with a vector update loop according to the present invention can result in code that will execute the loop approximately three times faster than the former scalar loop. For code with maximum overlap (all elements of Y operate on one element in X) execution will occur at approximately the same rate. For programs with sparse operations over large data spaces, computing efficiency can be expected to more than double.

Although the present invention has been described with reference to the preferred embodiments, those skilled in the art will recognize that changes may be made in form and detail without departing from the spirit and scope of the invention.

What I claim is:

1. A computer implemented method of compiling program code including a vector operation on an array of data elements stored in memory of a vector processing computer system with vector registers of length VL, the method comprising the steps of:
   a) scanning the program code for an equation which may have recurring data points;
   b) replacing the equation with vectorized machine executable code, wherein the machine executable code comprises a nested loop and wherein the nested loop comprises:
      an exterior loop which decomposes the equation into a plurality of vector length loops, including a current vector length loop;
      a first interior loop for executing vector operations corresponding to the current vector length loop to form a vector register length result vector;
      a second interior loop for determining occurrences, within the current vector length loop, of recurring data points, wherein the second interior loop comprises code for performing indirect writes of known values to said array, code for performing indirect reads of said array and code for comparing data read during the indirect reads of the array to the known values written to the array; and
      a third interior loop for repairing elements of the result vector associated with the recurring data points and writing said repaired result vector to said memory; and
   c) saving the vectorized code to said memory.

2. A computer implemented method of compiling program code including a mathematical operation on an array of data elements stored in memory of a vector processing computer system with vector registers of length VL, the method comprising the steps of:
   a) scanning the program code for an equation which may have recurring data points;

b) replacing the equation with vectorized machine executable code, wherein the vectorized machine executable code comprises:
   vectorization code for performing the mathematical operation as a vector operation, wherein the vectorization code comprises code for performing the mathematical operation on a vector length subset of the data elements in order to form a VL element result vector and for storing the result vector in a first vector register;
   determining code for determining and correcting recurring data points in the result vector while the result vector is in the first vector register, said determining code comprising code for performing indirect writes of known values to said array of data in memory, for performing indirect reads of said array, for comparing data written during the indirect writes to data read during the indirect reads to find recurring data points and for correcting the result vector to compensate for the recurring data points; and
   code for saving the corrected result vector to memory; and
c) saving the vectorized code to said memory.

* * * * *